United States Patent [19]

Yale

[11] Patent Number: 4,885,956

[45] Date of Patent: Dec. 12, 1989

[54] POWER TRANSMISSION

[76] Inventor: O. Sherman Yale, 2021 Pebble Beach Blvd., Sun City Center, Fla. 33570

[21] Appl. No.: 182,332

[22] Filed: Apr. 18, 1988

[51] Int. Cl.$^4$ ............................................. F16H 1/44
[52] U.S. Cl. ..................................... 74/710.5; 74/713
[58] Field of Search ...................... 74/710, 710.5, 713; 415/31, 30, 25

[56] References Cited

U.S. PATENT DOCUMENTS

| | | | |
|---|---|---|---|
| 2,435,244 | 2/1948 | Stephens | 180/75 |
| 2,448,345 | 8/1948 | Aronson | 180/70 |
| 2,583,307 | 1/1952 | Schneider | 74/711 |
| 2,830,670 | 4/1958 | Ferguson | 180/75 |
| 2,861,477 | 11/1958 | Mueller | 74/711 |
| 2,918,830 | 12/1959 | O'Leary | 74/710.5 |
| 3,132,536 | 5/1964 | Sampietro | 74/700 |
| 3,145,583 | 8/1964 | Frentzel | 74/711 |
| 3,393,583 | 7/1968 | Mueller | 74/711 |
| 3,429,394 | 2/1969 | Jacono | 180/70 |
| 3,517,573 | 6/1970 | Roper | 74/711 |
| 3,686,976 | 8/1972 | Philippi | 74/711 |
| 3,690,426 | 9/1972 | Weisgerber | 74/710.5 X |
| 3,901,096 | 8/1975 | Woody | 74/413 |
| 3,987,689 | 10/1976 | Engle | 74/711 |
| 3,994,354 | 11/1976 | Haumaier | 180/65 |
| 4,004,471 | 1/1977 | Keske | 74/710.5 X |
| 4,012,968 | 3/1977 | Kelbel | 74/711 |
| 4,258,588 | 3/1981 | Yum | 74/710.5 |
| 4,389,908 | 6/1983 | Dudek | 73/710.5 X |
| 4,454,786 | 6/1984 | Stockton | 74/688 |

FOREIGN PATENT DOCUMENTS 3536578 4/1986 Fed. Rep. of Germany ..... 74/710.5
819450 4/1981 U.S.S.R. ............................... 74/713

Primary Examiner—Dwight G. Diehl
Attorney, Agent, or Firm—Lahive & Cockfield

[57] ABSTRACT

A power transmission with differential action employs hydraulic screw pumps for stepless variable coupling between the drive shaft and a driven shaft, axle or axles. The pump screws are driven by gears respectively engaging oppositely facing bevel tooth sets on a master gear. Centrifugal forces urge choke sleeves slidable on the screw pump housings to close the ports progressively, ultimately approximating drive conditions at a predetermined speed of the driven shaft, axle or axles.

16 Claims, 1 Drawing Sheet

U.S. Patent  Dec. 12, 1989  4,885,956
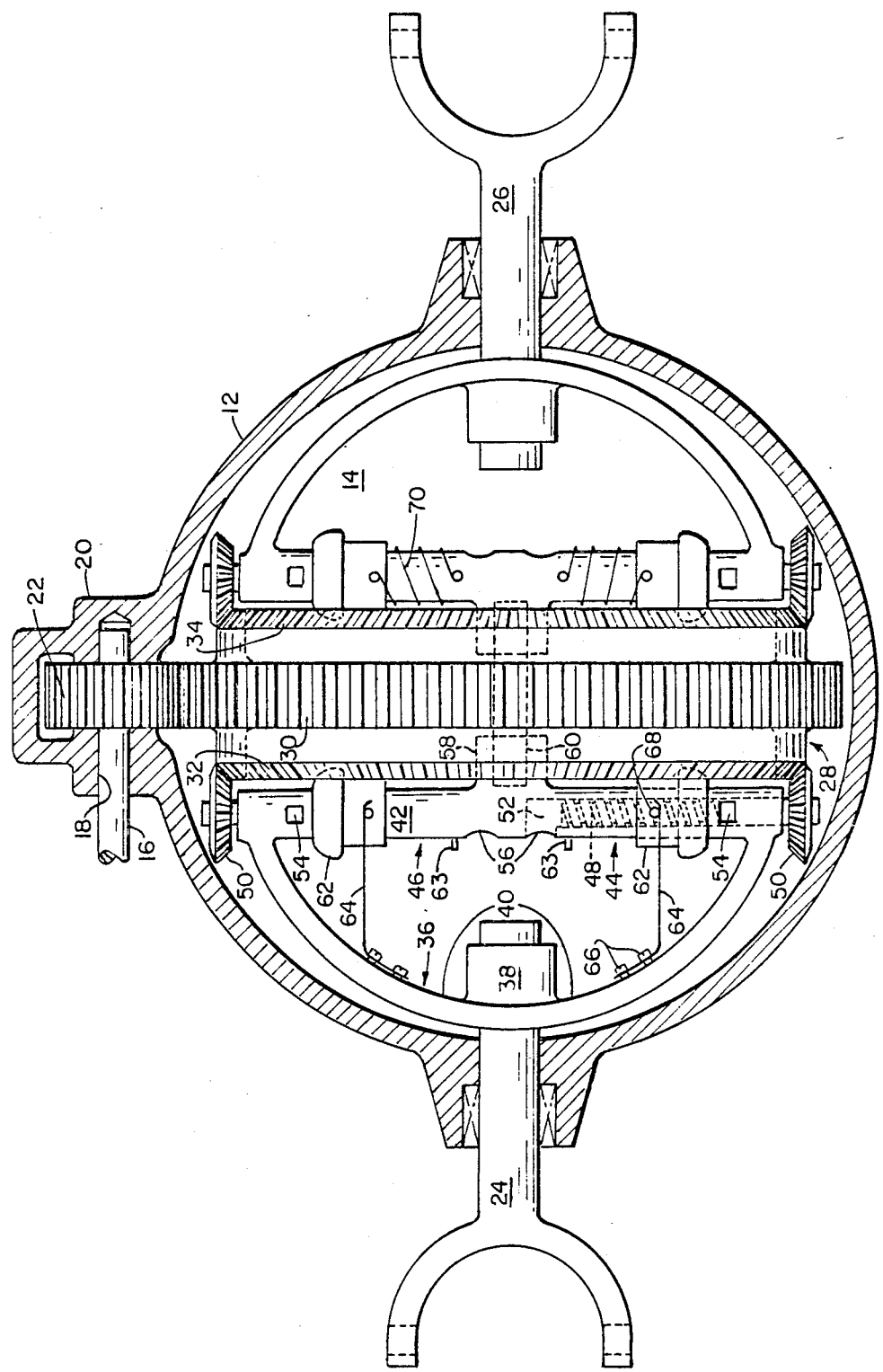

POWER TRANSMISSION

This invention relates generally to mechanical power transmissions. More particularly, it concerns a geared transmission adapted for automatic, continuously variable speed coupling between a drive shaft and a driven shaft, axle or axles.

An illustrative application for the invention is an automotive transmission having differential-driven wheel half-axles, although other applications will become evident from the following description. A conventional differential transmits power to a pair of half-axles from a drive shaft, the drive shaft extending to the differential from a transmission. Conventional transmissions comprise fluid couplings, clutches, chain drives, belts and manual or other external speed controls.

An object of this invention is to provide a transmission having an automatic variable speed coupling between the drive shaft and one or two driven shafts or axles, the speed variability being partially a function of the speed of the drive shaft and partially a function of design parameters in the transmission. In one application, the driven shaft, axle or axles is to be stationary within a range of extremely low speeds of the drive shaft, and as the speed is increased above this range the speed of the driven shaft, axle or axles is to increase in a stepless, uniform manner, until a condition approximating direct drive, is achieved at a predetermined speed of the driven shaft, axle or axles.

A second object of this invention is to provide a simplified transmission that may incorporate the functions of the transmission and differential in a single housing, with a reduced number of component parts and simplified construction.

A third object, in transmissions incorporating a differential function, is to provide a transmission in which neither of the two driven axles can be driven faster than the other driven axle.

A fourth object related to the foregoing is to provide means for varying the speed coupling characteristics to achieve an optimum transfer of energy and to hold the engine or other drive means within its most favorable torque range.

Still other objects are to provide a transmission adapted for forward and reverse rotation of the driven axle or axles.

With the foregoing and other objects in view, the features of this invention are embodied in a power transmission including a master gear having an annular tooth set, and a driven shaft or axle having an attached yoke member. The yoke member comprises a screw pump housing extending radially of the driven shaft or axle, with intake and exhaust ports in spaced relation. A pump screw is rotatable in the pump housing and attached to a pump gear that engages the annular tooth set on the master gear. The pump housing is immersed in transmission fluid contained within a suitable casing.

The yoke member is also provided with choke means that are movable in response to the centrifugal force produced by rotation of the pump housing to close one of the ports progressively. This progressively increases the drag force on the screw pump gear by reason of the throttling of transmission fluid flow through the screw pump, thereby reducing the angular speed ratio between the master gear and the pump gear.

Preferably, means are provided for resiliently restraining the choke means in opposition to the said centrifugal force. Such means may comprise coil or leaf springs.

The invention is advantageously employed in a "no-spin" differential arrangement for driving coaxial half-axles, by providing a pair of yoke members with corresponding screw pump means for attachment to the half-axles on opposing sides of the master gear.

The invention is adapted for wide adjustment and control of the torque transmission. This may be accomplished by changing or varying any one or more of the following parameters: screw pump efficiency, fluid viscosity, orifice sizes and shapes, choke sleeve mass and choke sleeve restraining spring characteristics.

Other features of the invention will become evident from the following description and by reference to the appended drawing.

DESCRIPTION OF THE DRAWING

The drawing illustrates the presently preferred embodiment of the invention as applied to a differential power transmission, and illustrates two alternative forms of choke means restraints. The scale, tooth ratios, configurations of the parts and relative dimensions have been chosen for convenience of illustration and may be varied in practice to suit particular applications.

DETAILED DESCRIPTION

The drawing illustrates a transmission housed within a casing 12 forming an enclosed space filled with a transmission fluid 14. A drive shaft 16 rotates in a sleeve or other suitable bearing 18 formed in a boss 20 on the casing, and is keyed to a spur gear 22.

A pair of coaxial driven half-axles 24 and 26 extend from the casing. In operation, the drive shaft 16 is engaged with a power source by any desired conventional means (not shown) which may include various forms of motors, fluid couplings, clutches, or the like. Power is transferred for driving the half-axles 24 and 26 by rotation of a master gear 28 meshed with the gear 22. The gear 28 comprises a body of integral construction including a spur gear tooth set 30 and two identical bevel gear tooth sets 32 and 34.

The half-axle 24 is driven as follows. A yoke member 36 has a hub 38 splined on the half-axle 24 and arcuate arms 40 extending to integral or attached ends of a screw pump housing 42. The housing forms a pair of screw pumps 44 and 46, each having therein a pump screw 48 with a shaft extending from the housing and attached to a bevel pump gear 50. The gears 50 on opposite ends of the housing 42 are engaged with diammetrically opposed portions of the bevel tooth set 32 on the master gear.

Each of the screw pumps 44 and 46 has an internal axial passage 52. A pair of mutually spaced ports 54 and 56 communicate between opposite ends of each passage 52 and the exterior of the housing 42.

A hub 58 integral with the housing 42 is formed with a sleeve or other suitable bearing for receiving and supporting one end of a shaft 60 on the master gear 28.

Choke sleeves 62 are slidable on the housing 42 and are movable to positions closing the ports 54. Stop pins 63 projeting from the housing prevent the sleeves from closing the ports 56. The sleeves 62 are formed of a material of sufficient mass and dimensions to develop appreciable centrifugal force when the housing 42 is rotated. Leaf springs 64, attached by screws 66 to yoke arms 40, bear on pins 68 projecting from the sleeves 62, and are adapted to apply restraining forces to the latter in opposition to the centrifugal forces.

The construction of the parts associated with the opposite half-axle 26 is preferably identical to that described above with reference to the half-axle 24, and is omitted herein for brevity. In the drawing, a helical tension spring 70 has been illustrated as attached between the screw pump housing and the choke sleeve, as an alternative to the leaf springs 64 previously described. However, it should be understood that preferably, one or the other of these forms of springs, or the equivalents thereof, is employed for each of the four illustrated choke sleeves.

The operation is described as follows, assuming that the speed of the drive shaft 16 is accelerated from zero to a speed producing an approximation of direct drive as described below. If the drive shaft 16 is started from a dead stop and rotated within an idling range of very low speeds, the gear 22 rotates the master gear 28 which in turn rotates the pump gears of each coaxial pair in opposite directions, and turns their respective pump screws 48. The screws each draw transmission fluid through one of the ports, such as 54, and discharge it through the other port, such as 56. The ports are of sufficient size in relation to the viscosity of the transmission fluid to allow the pump screws to rotate freely, with little drag torque being transmitted through the gears 50 to the master gear 28. Under these idling conditions, while the master gear 28 slowly rotates, the yoke members 36 do not rotate and the half-axles 24 and 26 remain stationary.

As the speed of the master gear increases above the idling range, transmission fluid flow through the ports 54 and 56 increases and the restrictions at the ports and within the passages 52 produce increasing flow resistance and an increasing drag torque on the pump screws 48 and pump gears 50. Eventually, the speed of the master gear 28 increases to a level such that the pump gears, being subject to increasing drag forces, begin to accelerate at a slower rate and the yoke members 40 and half-axles begin to rotate. The half-axles 24 and 26 will rotate at increasing speeds as the speed of the master gear continues to increase above this level, while the corresponding drag torque produced by the flow of transmission fluid through the screw pumps increases and follows a characteristic determined by the geometry of the screw pumps, the dimensions of the ports 54 and 56 and the viscosity and other flow characteristics of the transmission fluid. In certain designs the fluid flow through the screw pumps levels off, largely under the control of the port dimensions. In such cases the speed of the screw pumps will reach a constant level and a linear relationship will be established between the speeds of the drive shaft 16 and the axle 24. This relationship will continue until the choke sleeves 62 reach the ports 54 as next described.

The rotation of the yoke members 40 applies centrifugal force to the choke sleeves 62, tending to cause them to slide radially outwardly toward and over the outer ports 54. This motion is opposed by the leaf springs 64 or corresponding helical springs 70, and may be varied by changing the mass of the sleeves 62 or the spring constants, or both. At a predetermined rotational speed of the half-axles 24 and 26, the choke sleeves 62 cover the outer ports 54, creating a "lock-up" condition. The blockage of either the intake or the exhaust port of each passage 52 substantially obstructs the flow of transmission fluid therethrough, allowing the pump screw to rotate only at an extremely low rate as permitted by clearance leakage in the flow passage and through the ports. Under these conditions the yoke members 36 rotate at substantially the same speed as the master gear 28. Thus a substantially direct drive condition exists between the drive shaft 16 and the driven half-axles 24 and 26 at a speed ratio corresponding to the tooth ratio of the gears 22 and 30.

The contours of the ports 54, shown as rectangular in the drawing, may be varied to change the shape of the curve representing axle speed versus drive shaft speed in the transition region that initiates the "lock-up" condition. By the use of V-shaped ports 54, for example, the screw pump speeds, which begin the transition at a constant level as previously described, may be caused to decrease at a more gradual rate toward the lock-up condition.

It will be noted from the foregoing description that the apparatus herein described provides power transmission from zero to approximately direct drive without external control. It will also be noted that the transmission may be driven with either sense of rotation. In a vehicular drive transmission, the sense of the pump screw flights is such that at forward speeds, the outer ports 54 are preferably the intake ports, so that the "lock-up" condition corresponds to the throttling of the fluid intakes of the screw pumps, although the transmission is also operative for the opposite sense of rotation of the pump screws.

It will be further noted that the above-described structure on a single side of the master gear 28 is capable of transmitting power from the drive shaft 16 to a single shaft or axle without the necessity of another similar structure on the opposite side of the master gear for a second axle. The provision of two identical structures for two half-axles as shown provides the obvious advantage of "no-spin" differential action, and also provides for a balanced distribution of load forces and wear under normal operating conditions.

As stated above, in the drawing the relative dimensions and configurations of the parts have been chosen for clarity of illustration, and may be varied as a matter of design. In addition, other structural alterations may be made for particular applications. For example, whereas the axis of the drive shaft 16 is shown parallel to that of the driven axles, it may be normal thereto if desired. In such case the gear 22 may be replaced by a worm gear engaging suitably cut teeth 30.

In general, the design of a transmission according to this invention will involve choices with regard to screw pump flow characteristics, the sizes of the ports 54 and 56, the strengths of the springs 64 or 70, the weights of the choke sleeves 62 and the hydraulic fluid viscosity. These parameters are chosen to achieve the optimum engine output within the most favorable load torque range.

I claim:

1. A power transmission comprising, in combination, a master gear having at least one annular tooth set, means for drivingly engaging the master gear with a power source,
a driven shaft,
a yoke member attached to the shaft and including a screw pump housing extending radially with respect to the shaft with a pair of ports in spaced relation, a pump screw rotatable in the housing and a pump gear attached to the screw and engaging said annular tooth set, and a casing for transmission fluid, the pump housing being located for immersion in said fluid.

2. A power transmission according to claim 1, in which the yoke member has choke means movable in response to centrifugal force thereon to close one of said ports progressively.

3. A power transmission according to claim 2, in which the choke means comprise a sleeve slidable on the screw pump housing.

4. A power transmission according to claim 2, including means resiliently urging the choke means in opposition to said centrifugal force.

5. A power transmission according to claim 1, in which said annular tooth set and pump gear are bevel gears.

6. A power transmission according to claim 1, in which the yoke member has a pair of screw pump housings each extending radially with respect to the shaft and each having fluid inlet and outlet ports in spaced relation, a pump screw rotatable therein and a pump gear attached to the screw, said pump gears engaging diametrically opposed portions of said annular tooth set.

7. A power transmission according to claim 6, in which the yoke member has choke means movable in response to centrifugal force thereon to close a port on each of the pump housings progressively.

8. A power transmission according to claim 1, in which the master gear comprises a drive gear engageable with the power source and a bevel gear engaged with a pump gear, the bevel gear being affixed to the drive gear.

9. A power transmission comprising, in combination,
a master gear having a pair of coaxial, oppositely facing annular tooth sets,
means for drivingly engaging the master gear with a power source,
a pair of coaxial driven shafts,
a pair of yoke members each attached to a shaft and including a screw pump housing extending radially with respect to the shaft with a pair of ports in spaced relation, a pump screw rotatable in the housing and a pump gear attached to the screw, the pump gears respectively engaging said oppositely facing gear sets, and
a casing for transmission fluid, the pump housings being located for immersion in said fluid.

10. A power transmission according to claim 9, in which said yoke member has choke means movable in response to centrifugal force thereon to close one of said ports progressively.

11. A power transmission according to claim 10, in which each choke means comprises a sleeve slidable on a screw pump housing.

12. A power transmission according to claim 10, including means resiliently urging each choke means in opposition to said centrifugal force.

13. A power transmission according to claim 9, in which each annular tooth set and its engaging pump gear are bevel gears.

14. A power transmission according to claim 9, in which each yoke member has a pair of screw pump housings each extending radially with respect to each having fluid inlet and outlet ports in spaced relation, a pump screw rotatable therein and a pump gear attached to the screw, the pump gears of each pair of pump housings engaging diametrically opposed portions of an annular tooth set.

15. A power transmission according to claim 14, in which each yoke member has choke means movable in response to centrifugal force thereon to close a port on a pump housing progressively.

16. A power transmission according to claim 9, in which the master gear comprises a drive gear engageable with the power source and a pair of bevel gears each engaged with a pump gear, the bevel gears being affixed to the drive gear.

* * * * *

UNITED STATES PATENT AND TRADEMARK OFFICE
CERTIFICATE OF CORRECTION

PATENT NO.   :   4,885,956
DATED        :   December 12, 1989
INVENTOR(S)  :   O. Sherman Yale It is certified that error appears in the above-identified patent and that said Letters Patent is hereby corrected as shown below:

In the title, cancel "Power Transmission" and substitute --Screw Pump Controlled Variable Speed Transmission--.

In the Abstract, line 8, after "approximating" insert --direct--.

Column 2, line 63, cancel "projeting" and substitute --projecting--.

Column 6, line 23, (claim 14), after "to" insert --the shafts and--.

Signed and Sealed this

Sixteenth Day of October, 1990

*Attest:*

HARRY F. MANBECK, JR.

*Attesting Officer*          *Commissioner of Patents and Trademarks*